(12) United States Patent
Wu

(10) Patent No.: US 10,187,915 B2
(45) Date of Patent: Jan. 22, 2019

(54) CONTROLLING METHOD FOR PORTABLE INFORMATION CAPTURE DEVICE AND ENVIRONMENTAL SURVEILLANCE SYSTEM

(71) Applicant: GETAC TECHNOLOGY CORPORATION, Hsinchu County (TW)

(72) Inventor: Chia-Chuan Wu, Taipei (TW)

(73) Assignee: GETAC TECHNOLOGY CORPORATION, Hsinchu (TW)

( * ) Notice: Subject to any disclaimer, the term of this patent is extended or adjusted under 35 U.S.C. 154(b) by 222 days.

(21) Appl. No.: 15/431,670

(22) Filed: Feb. 13, 2017

(65) Prior Publication Data

US 2018/0063874 A1 Mar. 1, 2018

Related U.S. Application Data

(60) Provisional application No. 62/382,718, filed on Sep. 1, 2016.

(51) Int. Cl.
| | |
|---|---|
| *G06F 15/16* | (2006.01) |
| *H04W 76/10* | (2018.01) |
| *G08B 13/196* | (2006.01) |
| *H04N 7/18* | (2006.01) |
| *G08B 25/00* | (2006.01) |

(52) U.S. Cl.
CPC ...... *H04W 76/10* (2018.02); *G08B 13/19695* (2013.01); *G08B 25/009* (2013.01); *H04N 7/188* (2013.01); *G08B 13/1966* (2013.01); *G08B 13/19697* (2013.01)

(58) Field of Classification Search
USPC ....... 709/203, 206, 217, 219, 223, 224, 226, 709/227, 228, 230, 238; 726/27; 370/311
See application file for complete search history.

(56) References Cited

U.S. PATENT DOCUMENTS

| | | | | |
|---|---|---|---|---|
| 8,677,505 | B2 * | 3/2014 | Redlich | G06F 21/577 726/27 |
| 2013/0336188 | A1 * | 12/2013 | Yomo | H04W 52/0206 370/311 |
| 2014/0317262 | A1 * | 10/2014 | Bouvet | H04L 41/08 709/223 |
| 2017/0064623 | A1 * | 3/2017 | Sekiya | H04W 52/0206 |

* cited by examiner

*Primary Examiner* — Quang N Nguyen

(57) ABSTRACT

A controlling method for a portable information capture device includes controlling the portable information capture device to run in a relay station mode or a workstation mode via a wireless connection by using a mobile device, when the portable information capture device runs in the relay station mode, receiving a media data of the portable information capture device via the wireless connection by using the mobile device, and when the portable information capture device runs in the workstation mode, transmitting a connection data to the portable information capture device via the wireless connection by using the mobile device, so as to cause the portable information capture device using the connection data to build a connection with a relay station.

6 Claims, 4 Drawing Sheets

CONTROLLING METHOD FOR PORTABLE INFORMATION CAPTURE DEVICE AND ENVIRONMENTAL SURVEILLANCE SYSTEM

BACKGROUND OF THE INVENTION

Field of the Invention

The present invention relates to wireless control technology and, more particularly, to a method of controlling a portable information capturing device and an environmental surveillance system.

Description of the Prior Art

In general, conventional portable information capturing devices capture media data, such as images and sounds. Due to increasing awareness among the public of personal safety, it is advantageous for portable information capturing devices to take on a safety-enhancing role because of their portability and capability of capturing real-time information, thereby widening their applications.

For instance, it is advantageous for police officers on duty to carry portable information capturing devices to not only assist the police officers in policing but also allow media data captured by the portable information capturing devices to serve as evidence presented to a court of law.

SUMMARY OF THE INVENTION

In an embodiment, a method of controlling a portable information capturing device, comprising the steps of: controlling the portable information capturing device to execute a relay station mode or a workstation mode with a mobile device through a wireless connection; receiving a media data from the portable information capturing device with the mobile device through the wireless connection when the portable information capturing device executes the relay station mode; and sending a connection data to the portable information capturing device when the portable information capturing device executes the workstation mode with the mobile device through the wireless connection, thereby allowing the portable information capturing device to create a connection to a relay station according to the connection data.

In an embodiment, an environmental surveillance system comprises a portable information capturing device and a mobile device. The mobile device is wirelessly connected to the portable information capturing device and controls, through the wireless connection, the portable information capturing device to execute a relay station mode or a workstation mode. The mobile device receives a media data from the portable information capturing device through the wireless connection when the portable information capturing device executes the relay station mode, and sends a connection data to the portable information capturing device through the wireless connection when the portable information capturing device executes the workstation mode, thereby allowing the portable information capturing device to create a connection to a relay station according to the connection data.

In conclusion, a method of controlling a portable information capturing device and an environmental surveillance system according to an embodiment of the present invention are characterized in that the portable information capturing device is controlled through a mobile device to execute a relay station mode or a workstation mode, so as to receive a media data from the portable information capturing device directly or receive the media data through the relay station, i.e., a third party. Furthermore, the method of controlling a portable information capturing device and an environmental surveillance system according to an embodiment of the present invention are further characterized in that a high-power-consumption wireless transmission module of the portable information capturing device is default to be OFF and will be enabled to operate only if the mobile device requests creating a wireless connection, it reduces power consumption of the portable information capturing device and extends its operating session.

Fine features and advantages of the present invention are described below to enable persons skilled in the art to gain insight into the technical solution disclosed in the present invention and thus implement the present invention. Furthermore, persons skilled in the art can easily understand related objectives and advantages of the present invention by referring to the disclosure contained herein, the claims, and the accompanying drawings.

DETAILED DESCRIPTION OF THE EMBODIMENTS

Figure 1:
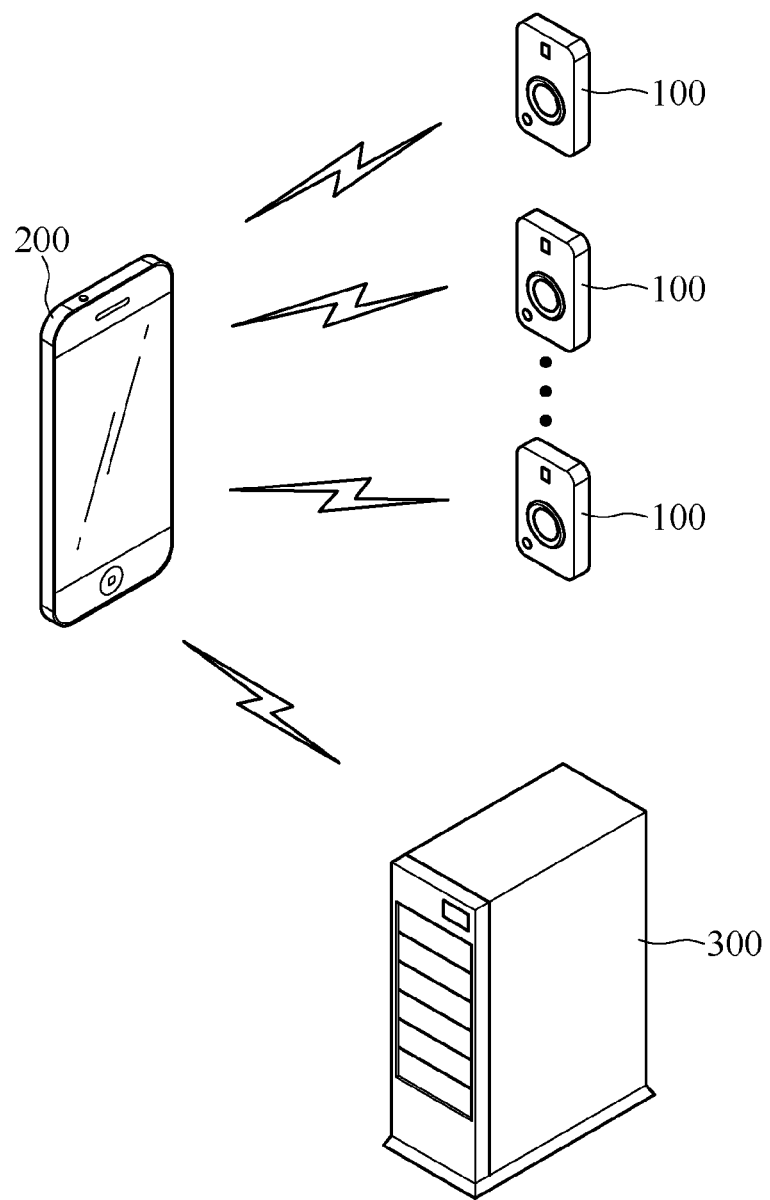
FIG. 1 is a schematic view of an environmental surveillance system according to an embodiment of the present invention.
Figure 2:
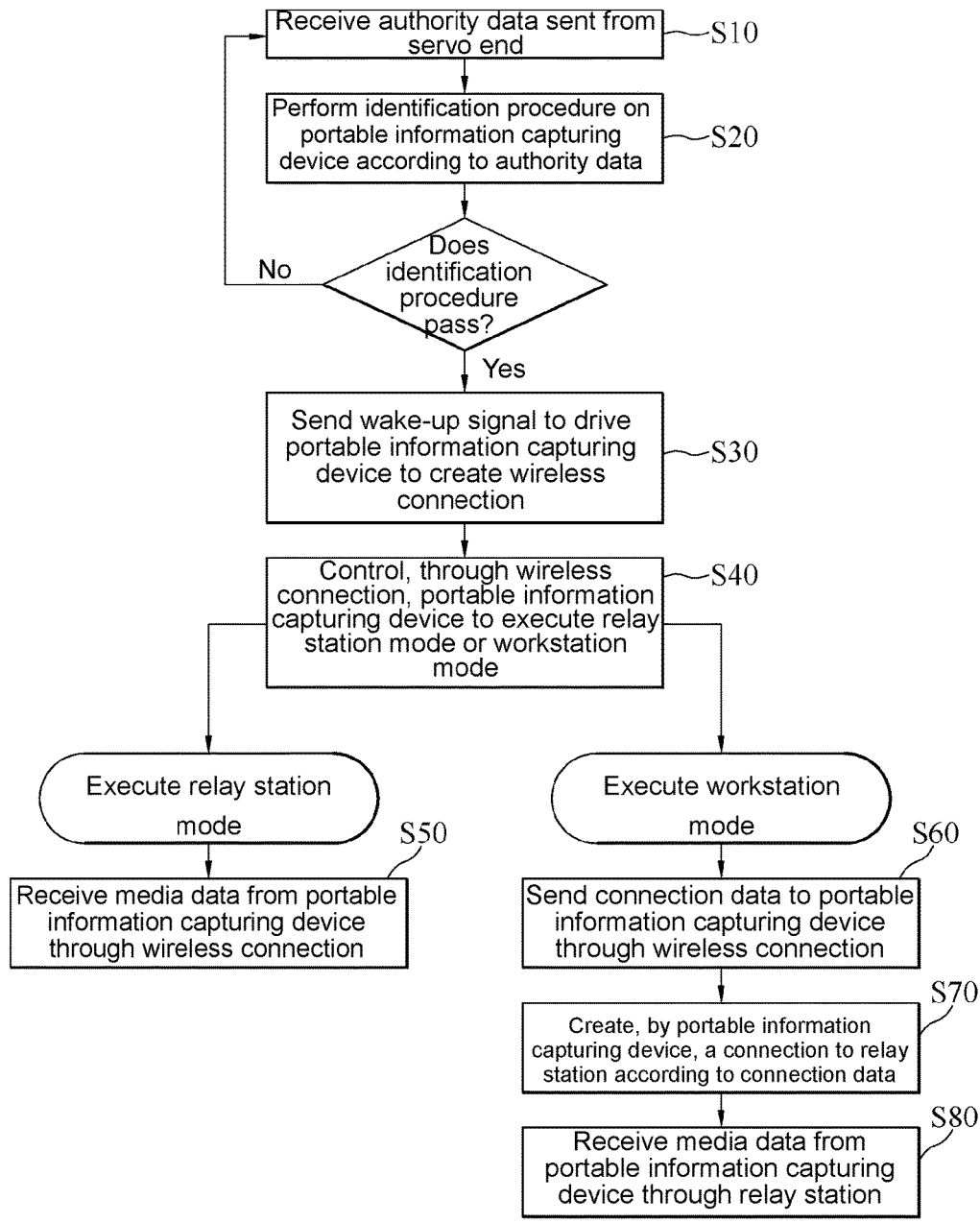
FIG. 2 is a flow chart of a method of controlling a portable information capturing device according to an embodiment of the present invention.

FIG. 1 is a schematic view of an environmental surveillance system according to an embodiment of the present invention. FIG. 2 is a flow chart of a method of controlling a portable information capturing device according to an embodiment of the present invention. Referring to FIG. 1 and FIG. 2, the environmental surveillance system comprises portable information capturing devices 100 and a mobile device 200. The mobile device 200 is signal-connected to the portable information capturing devices 100 to control the operation of the portable information capturing devices 100.

The environmental surveillance system further comprises a servo end 300. The mobile device 200 is signal-connected to the servo end 300 and receives an authority data D1 sent from the servo end 300 (step S10). The mobile device 200 controls a corresponding one of the portable information capturing devices 100 according to the authority data D1.

In some embodiments, the authority data D1 comprises the username, password, and type of captured data of the portable information capturing device 100 being controlled by the mobile device 200.

In some embodiments, the portable information capturing devices 100 are multimedia capturing devices, such as body-worn cameras, walkmans, recorder pens, and event data recorders. The mobile device 200 is a portable electronic device capable of wireless connection, such as a cellular phone or a tablet. The servo end 300 comprises one or more hosts, and each host is a computer or a server, but the present invention is not limited thereto.

In some embodiments, the portable information capturing devices 100 are worn at any parts, such as the head and the chest, of a user, and the user holds the mobile device 200 by hand so that the mobile device 200 moves together with the user, but the present invention is not limited thereto.

Figure 3:
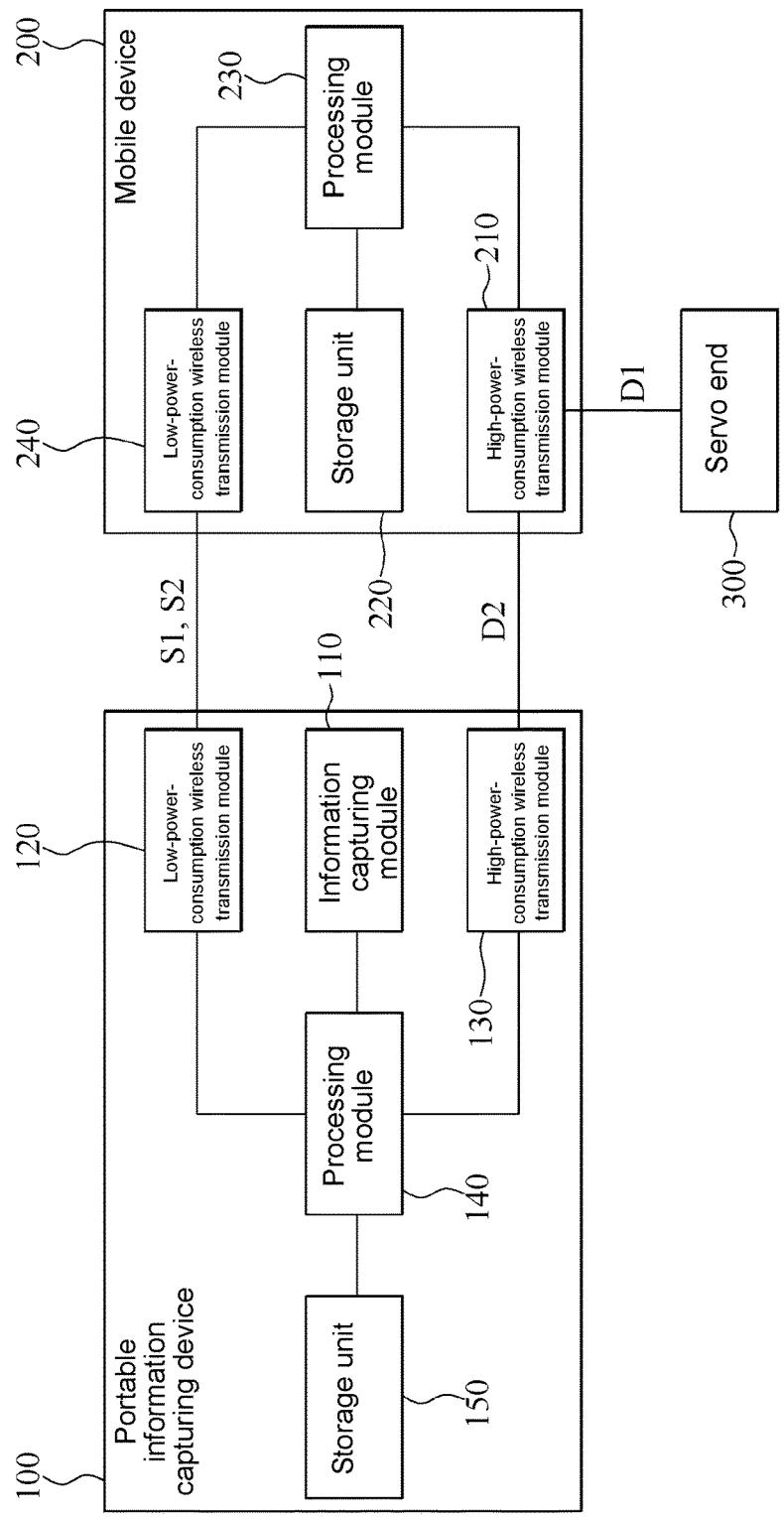
FIG. 3 is a block diagram of the environmental surveillance system according to the first embodiment of the present invention.

FIG. 3 is a block diagram of the environmental surveillance system according to the first embodiment of the present invention. Referring to FIG. 1 through FIG. 3, the portable information capturing devices 100 each comprise an information capturing module 110, a low-power-consumption wireless transmission module 120, a high-power-consumption wireless transmission module 130, and a processing module 140. The processing module 140 is coupled to the information capturing module 110, the low-power-consumption wireless transmission module 120, and the high-power-consumption wireless transmission module 130.

The information capturing module 110 generates and uploads the authority data D1. In some embodiments, the information capturing module 110 records the surroundings of the portable information capturing device 100 to create a media data D2. The low-power-consumption wireless transmission module 120 effectuates wireless transmission by low-power-consumption wireless transmission technology. The high-power-consumption wireless transmission module 130 effectuates wireless transmission by high-power-consumption wireless transmission technology. The processing module 140 controls the operation of the information capturing module 110, the low-power-consumption wireless transmission module 120, and the high-power-consumption wireless transmission module 130.

In an embodiment, the low-power-consumption wireless transmission module 120 of each portable information capturing device 100 is characterized by low power consumption and thus often enabled. For example, the low-power-consumption wireless transmission module 120 is default to be ON, regardless of whether the portable information capturing device 100 has started. But the present invention is not limited thereto. In another embodiment, the low-power-consumption wireless transmission module 120 of each portable information capturing device 100 starts as soon as the portable information capturing device 100 starts. The high-power-consumption wireless transmission module 130 of each portable information capturing device 100 is initially OFF (i.e., not operating) in order to minimize power consumption.

In some embodiments, the media data D2 is multimedia data descriptive of images and/or sounds. The information capturing module 110 is audiovisual input equipment, such as a camera lens and/or a microphone. The processing module 140 is an SoC (System on a Chip), a CPU (central processing unit), or an MCU (microcontroller), but the present invention is not limited thereto.

In an embodiment, the portable information capturing devices 100 each further comprise a storage unit 150. The storage unit 150 is coupled to the processing module 140. The storage unit 150 stores the media data D2 created by the information capturing module 110.

In some embodiments, the storage unit 150 is provided in the form of one or more storage components. The storage components are non-volatile memory (such as ROM and flash memory) or volatile memory (such as RAM).

The mobile device 200 comprises a high-power-consumption wireless transmission module 210, a storage unit 220, and a processing module 230. The processing module 230 is coupled to the high-power-consumption wireless transmission module 210 and the storage unit 220. In some embodiments, the processing module 230 is an SoC (System on a Chip), a CPU (central processing unit), or an MCU (microcontroller), but the present invention is not limited thereto.

In general, the high-power-consumption wireless transmission module 210 has a signal reception range, and the servo end 300 is permanently installed at a specific venue, such as an office. Hence, when the user carries the mobile device 200 while moving around so as to allow the servo end 300 to fall into the wireless signal range of the high-power-consumption wireless transmission module 210 of the mobile device 200, the processing module 230 of the mobile device 200 creates a wireless connection to the servo end 300 through the high-power-consumption wireless transmission module 210, downloads the authority data D1 through the wireless connection, and stores the authority data D1 in the storage unit 220.

In an embodiment, when the high-power-consumption wireless transmission module 210 of the mobile device 200 wants to create a wireless connection to the servo end 300, the servo end 300 performs an authentication procedure on the mobile device 200 to confirm whether the mobile device 200 is connectable. It is only when the servo end 300 confirms the connectability of the mobile device 200 to therefore pass the authentication procedure that the servo end 300 creates a wireless connection to the mobile device 200, and that the mobile device 200 downloads the authority data D1 from the servo end 300. Conversely, if the authentication procedure does not pass, the servo end 300 will not create a wireless connection to the mobile device 200.

The mobile device 200 further comprises a low-power-consumption wireless transmission module 240. The low-power-consumption wireless transmission module 240 is coupled to the processing module 230. In an embodiment, with the low-power-consumption wireless transmission module 240 performing a scan within a detection range, for example, an area defined by a radius of 10 m, the processing module 230 figures out how many portable information capturing devices 100 fall within the detection range.

In an embodiment, with the low-power-consumption wireless transmission module 240 detecting for the presence of the low-power-consumption wireless transmission module 120 of each portable information capturing device 100 within a detection range, the processing module 230 figures out how many portable information capturing devices 100 fall within the detection range, and the processing module 230 performs an identification procedure on each portable information capturing device 100 according to the authority data D1 (step S20). If the low-power-consumption wireless transmission module 240 of the mobile device 200 detects multiple portable information capturing devices 100 within its detection range, the processing module 230 of the mobile device 200 will perform the identification procedure on each portable information capturing device 100 according to the authority data D1 obtained in step S10.

In an embodiment related to the identification procedure of step S20, the mobile device 200 performs the identification procedure on each portable information capturing device 100 by a confidential authentication mechanism, such as RSA authentication mechanism. For example, the processing module 230 sends a request signal to each portable information capturing device 100 through the low-power-consumption wireless transmission module 240. After receiving the request signal, the processing module 140 of each portable information capturing device 100 generates an encrypted string according to a prestored public key and sends the encrypted string to the mobile device 200 through the low-power-consumption wireless transmission module 120. Afterward, the processing module 230 of the mobile device 200 decrypts the encrypted string according to a private key contained in the authority data D1 and sends the decrypted string back to the portable information capturing device 100 through the low-power-consumption wireless transmission module 240 of the mobile device 200, allowing the portable information capturing device 100 to confirm, according to the string returned by the mobile device 200, whether the mobile device 200 is controllable.

After passing the identification procedure, the mobile device 200 controls the portable information capturing device 100 freely. Conversely, if the mobile device 200 does not pass the identification procedure, the portable information capturing device 100 will not be controlled by the mobile device 200. In an embodiment, if the mobile device 200 does not pass the identification procedure, step S10 will be executed anew.

In an embodiment, the low-power-consumption wireless transmission module 240 of the mobile device 200 sends a control instruction S1 to the portable information capturing device 100 by low-power-consumption wireless transmission, instructing the portable information capturing device 100 to act according to the control instruction S1.

For instance, if the control instruction S1 received by the low-power-consumption wireless transmission module 120 of the portable information capturing device 100 is a video recording signal, the processing module 140 of the portable information capturing device 100 will drive the information capturing module 110 to begin capturing images. If the control instruction S1 received by the low-power-consumption wireless transmission module 120 of the portable information capturing device 100 is a pause signal, the processing module 140 of the portable information capturing device 100 will disable the information capturing module 110 to stop the information capturing module 110 from capturing images.

If it is necessary for the mobile device 200 to create a wireless connection to the portable information capturing device 100, the low-power-consumption wireless transmission module 240 of the mobile device 200 will send, by low-power-consumption wireless transmission, a wake-up signal S2 for driving the portable information capturing device 100 to create the wireless connection (step S30).

In an embodiment of step S30, after the low-power-consumption wireless transmission module 120 has received the wake-up signal S2, the processing module 140 drives the high-power-consumption wireless transmission module 130 such that a wireless connection is created between the high-power-consumption wireless transmission module 130 of the portable information capturing device 100 and the high-power-consumption wireless transmission module 210 of the mobile device 200.

In some embodiments, both the low-power-consumption wireless transmission module 120 of the portable information capturing device 100 and the low-power-consumption wireless transmission module 240 of the mobile device 200 are configured for Bluetooth, such as Classic Bluetooth, Bluetooth High Speed, and Bluetooth Low Energy (BLE), to effectuate data transmission with Bluetooth-enabled transmission modules. Both the high-power-consumption wireless transmission module 130 of the portable information capturing device 100 and the high-power-consumption wireless transmission module 210 of the mobile device 200 are WiFi transmission modules, but the present invention is not limited thereto.

In an embodiment, after the wireless connection between the mobile device 200 and the portable information capturing device 100 has been created, the mobile device 200 receives information pertaining to the status of the portable information capturing device 100. For example, after a body-worn camcorder has been connected to a cellular phone, information pertaining to the status of the body-worn camcorder, such as current power level, network connection, whether video recording is underway, and whether a video recording flash is on, is sent to an App or message list of the cellular phone and displayed on the screen thereof, thereby allowing the user to access the App or message list of the cellular phone and thus be informed of information pertaining to the status of the body-worn camcorder.

In an embodiment, after the wireless connection between the mobile device 200 and the portable information capturing device 100 has been created, the mobile device 200 controls operation modes of the portable information capturing device 100 through the wireless connection. For example, the mobile device 200 controls the portable information capturing device 100 to execute a relay station mode or a workstation mode through the wireless connection (step S40).

Referring to FIG. 3, when the portable information capturing device 100 executes the relay station mode, the mobile device 200 receives the media data D2 from the portable information capturing device 100 through the wireless connection (step S50). Hence, at this point in time, the mobile device 200 regards the portable information capturing device 100 as an access point (AP), downloads the media data D2 directly from the portable information capturing device 100, and stores the media data D2 in the storage unit 220.

Figure 4:
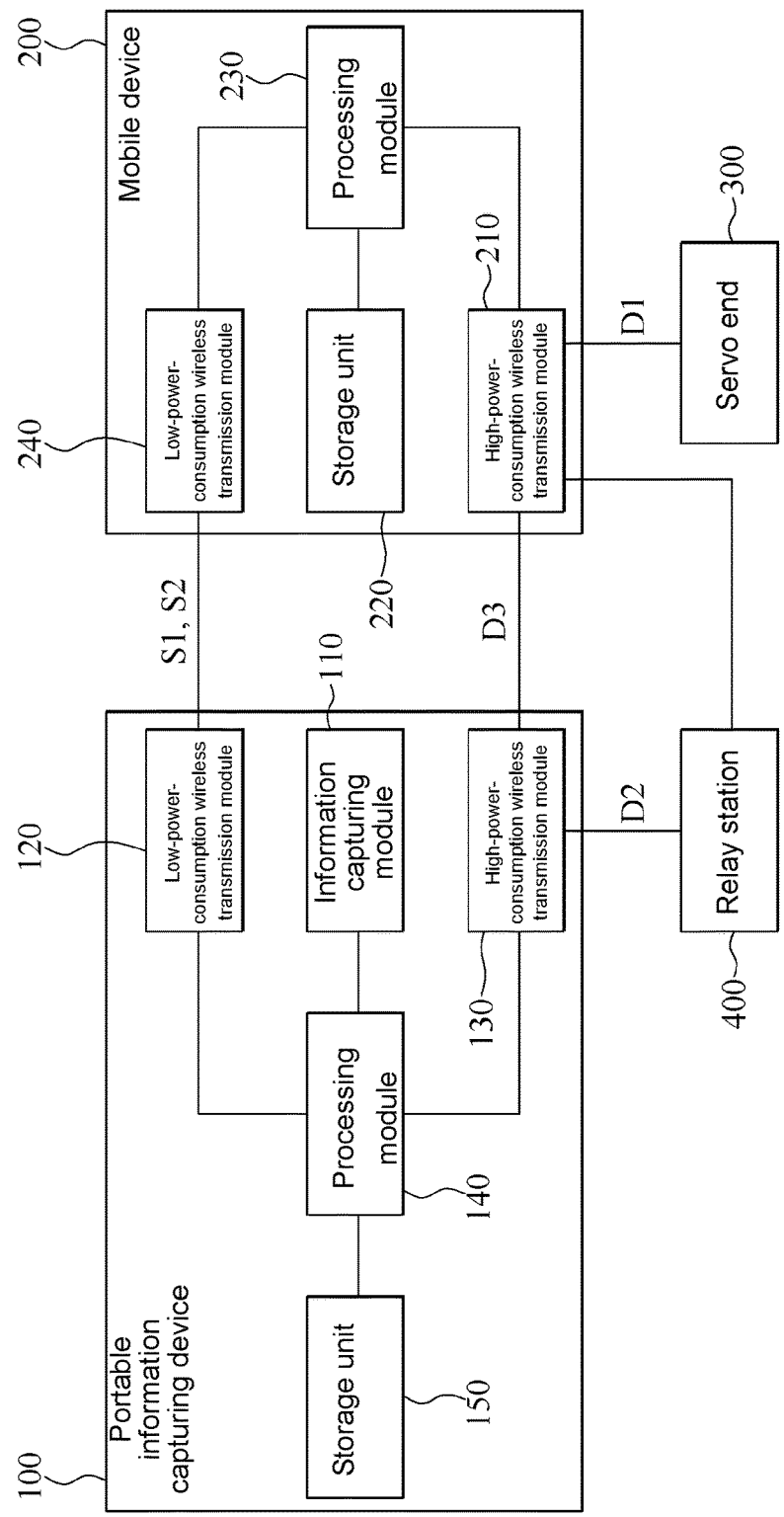
FIG. 4 is a block diagram of the environmental surveillance system according to the second embodiment of the present invention.

FIG. 4 is a block diagram of the environmental surveillance system according to the second embodiment of the present invention. Referring to FIG. 1 through FIG. 4, when the portable information capturing device 100 executes the workstation mode, the mobile device 200 sends a connection data D3 to the portable information capturing device 100 through the wireless connection (step S60), thereby allowing the portable information capturing device 100 to create a connection to a relay station 400 according to the connection data D3 (step S70). Afterward, the mobile device 200 receives the media data D2 from the portable information capturing device 100 through the relay station 400 (step S80).

In an embodiment of step S60 and step S70, the high-power-consumption wireless transmission module 210 of the mobile device 200 is wirelessly connected to the relay station 400. The mobile device 200 automatically captures a service identifier (such as Service Set Identifier, SSID) and a security type, for example, Wireless Encryption Protocol (WEP) and Wi-Fi Protected Access (WPA), of the relay station 400 as well as a user password, and sends the captured service identifier and security type of the relay station 400 and the user password to the portable information capturing device 100 through the high-power-consumption wireless transmission module 210, thereby allowing the processing module 140 of the portable information capturing device 100 to create a connection to the relay station 400 according to the connection data D3. Hence, at this point in time, the connection data comprises the service identifier, security type, and user password.

However, the present invention is not limited to the abovementioned. In another embodiment of step S60 and step S70, the connection data D3 sent from the mobile device 200 to the portable information capturing device 100 is restricted to the service identifier and security type of the relay station 400, and a user interface of the mobile device 200 displays a dialog box which requests the user to enter the user password by hand as soon as the portable information capturing device 100 creates a connection to the relay station 400 according to the connection data D3. After the user has entered the user password, the mobile device 200 sends the user password to the portable information capturing device 100, thereby allowing the portable information capturing device 100 to create a connection to the relay station 400 according to the connection data D3 and the user password. Hence, at this point in time, both the mobile device 200 and the portable information capturing device 100 are wirelessly connected to the relay station 400 and exchange data through the relay station 400.

In some embodiments, the relay station 400 comprises one or more hosts. Each host is a computer, server, gateway, or network attached storage (NAS).

In some embodiments, the media data D2 not only includes multiple multimedia data descriptive of images and/or sounds, but also includes data names, data types, and data configuration information of multimedia data. Hence, upon completion of the execution of step S50 or step S80 (i.e., after the mobile device 200 has received the media data D2), the user can not only directly playback the media data D2 with the play function of the mobile device 200, but also change the data names, data types, and data configuration information of the media data D2 with the mobile device 200.

In conclusion, a method of controlling a portable information capturing device and an environmental surveillance system according to an embodiment of the present invention are characterized in that the portable information capturing device is controlled through a mobile device to execute a relay station mode or a workstation mode, so as to receive a media data from the portable information capturing device directly or receive the media data through the relay station, i.e., a third party. Furthermore, the method of controlling a portable information capturing device and an environmental surveillance system according to an embodiment of the present invention are further characterized in that a high-power-consumption wireless transmission module of the portable information capturing device is default to be OFF and will be enabled to operate only if the mobile device requests creating a wireless connection, it reduces power consumption of the portable information capturing device and extends its operating session.

Although the present invention is disclosed above by preferred embodiments, the preferred embodiments are not restrictive of the present invention. Changes and modifications made by any persons skilled in the art to the preferred embodiments without departing from the spirit of the present invention are deemed falling into the scope of the present invention. Accordingly, the legal protection for the present invention should be defined by the appended claims.

What is claimed is:

1. A method of controlling a portable information capturing device, comprising the steps of:
    receiving at a mobile device an authority data sent from a servo end;
    performing an identification procedure on the portable information capturing device by the mobile device according to the authority data;
    sending a wake-up signal from the mobile device to the portable information capturing device to create a wireless connection to the mobile device;
    controlling the portable information capturing device to execute one of a relay station mode and a workstation mode with the mobile device through the wireless connection;
    receiving a media data from the portable information capturing device with the mobile device through the wireless connection when the portable information capturing device executes the relay station mode; and
    sending a connection data to the portable information capturing device with the mobile device through the wireless connection when the portable information capturing device executes the workstation mode, thereby allowing the portable information capturing device to create a connection to a relay station according to the connection data.

2. The method of controlling a portable information capturing device according to claim 1, wherein the wake-up signal is sent from the mobile device to the portable information capturing device by low-power-consumption wireless transmission to drive a high-power-consumption wireless transmission module of the portable information capturing device to create the wireless connection to the mobile device.

3. The method of controlling a portable information capturing device according to claim 1, wherein the connection data comprises a service identifier and a security type of the relay station.

4. An environmental surveillance system, comprising:
    a portable information capturing device;
    a mobile device creating a wireless connection to the portable information capturing device to control, through the wireless connection, the portable information capturing device to execute one of a relay station mode and a workstation mode, wherein the mobile device receives a media data from the portable information capturing device through the wireless connection when the portable information capturing device executes the relay station mode, and sends a connection data to the portable information capturing device through the wireless connection when the portable information capturing device executes the workstation mode, thereby allowing the portable information capturing device to create a connection to a relay station according to the connection data; and
    a servo end sending an authority data to the mobile device;
    wherein the mobile device performs an identification procedure on the portable information capturing device according to the authority data and sends, after passing the identification procedure, a wake-up signal to the portable information capturing device to create the wireless connection between the mobile device and the portable information capturing device.

5. The environmental surveillance system of claim 4, wherein the portable information capturing device comprises:
    an information capturing module for creating the media data;
    a low-power-consumption wireless transmission module for receiving the wake-up signal;
    a high-power-consumption wireless transmission module for creating the wireless connection to the mobile device; and
    a processing module for driving the high-power-consumption wireless transmission module as soon as the low-power-consumption wireless transmission module receives the wake-up signal.

6. The environmental surveillance system of claim 4, wherein the connection data comprises a service identifier and a security type of the relay station.

* * * * *